United States Patent [19]
Granger et al.

[11] Patent Number: 5,300,766
[45] Date of Patent: Apr. 5, 1994

[54] SCANNING SCENE-BASED WAVEFRONT SENSOR HAVING A LINEAR IMAGE SENSOR ARRAY AND A PUPIL SENSOR ARRAY

[75] Inventors: Edward M. Granger; Sara T. Wellman; Peter A. Jones, all of Rochester, N.Y.

[73] Assignee: Eastman Kodak Company, Rochester, N.Y.

[21] Appl. No.: 46,673

[22] Filed: Apr. 13, 1993

[51] Int. Cl.$^5$ ............................................... G01J 1/20
[52] U.S. Cl. .................................. 250/201.9; 356/121
[58] Field of Search .................... 250/201.9, 201.1; 356/121, 124, 149, 353, 354

[56] References Cited
U.S. PATENT DOCUMENTS

| | | |
|---|---|---|
| 3,923,400 | 12/1975 | Hardy . |
| 4,490,039 | 12/1984 | Bruckler et al. . |
| 4,518,854 | 5/1985 | Hutchin . |
| 4,667,103 | 5/1987 | Watson et al. . |
| 4,670,646 | 6/1987 | Spivey . |
| 4,696,573 | 9/1987 | Hutchin . |
| 4,712,913 | 12/1987 | Bareket . |
| 4,737,621 | 4/1988 | Gonsiorowski et al. . |
| 4,824,243 | 4/1989 | Wheeler et al. . |
| 4,950,878 | 8/1990 | Ulich et al. ........................ 356/354 |
| 5,146,072 | 9/1992 | Dey et al. ........................ 250/201.9 |

Primary Examiner—David C. Nelms
Assistant Examiner—Que T. Le
Attorney, Agent, or Firm—Thomas H. Close

[57] ABSTRACT

A new scene-based wavefront sensor is useful in a device as, for example, a telescope or camera that provides information of aberrations (e.g., out-of-focus condition) directly from light received from a scene in object space being scanned by movement of either the wavefront sensor or elements in the scene. The wavefront sensor includes an imaging system defining a predetermined pupil, a light opaque material having a surface and defining a probe hole (pinhole) therethrough, a linear image sensor array, a relay lens, and a pupil sensor array including a plurality of light sensors. The probe hole and image sensor array are disposed at a focal plane of the imaging system while the pupil sensor array is disposed at a focal plane of the pupil of the imaging system. As the wavefront sensor is moved to scan a predetermined scene in a direction normal to the orientation of the image sensor array, output signals of light intensity versus time detected by each of the sensors of the image and pupil sensor arrays are transmitted to a controller. The controller uses such output signals for determining if, for example, aberrations exist in the scanned scene and for generating control signals to a user device for correcting for such aberrations.

10 Claims, 4 Drawing Sheets

SCANNING SCENE-BASED WAVEFRONT SENSOR HAVING A LINEAR IMAGE SENSOR ARRAY AND A PUPIL SENSOR ARRAY

FIELD OF THE INVENTION

The present invention relates to a scene-based wavefront sensor for use with a device as, for example, a telescope or camera to provide information of aberrations (e.g., out-of-focus condition) directly from light received from a scene in object space being scanned by movement of either the wavefront sensor or elements in the scene.

BACKGROUND OF THE INVENTION

Wavefront sensors are used to provide image control in, for example, active optical systems used in various devices such as satellites, telescopes, and cameras. More particularly, known wavefront sensors include elements which provide information about phase distortions in a received wavefront, and/or which analyze, measure, and provide information signals to correct for aberrations (phase distortions) received in optical wavefronts. Such phase distortions or aberrations are produced in an image by, for example, a thermal expansion or contraction of a structure in, for example, a telescope or camera due to varying temperatures which changes distances between lenses and/or mirrors therein. It is to be understood that the wavefront sensor is a first element of an active control system which includes three elements. The second element is a controller which processes signal information generated by the wavefront sensor using an appropriate algorithm (software device) to analyze and determine what should be done with the signal information from the wavefront sensor. The third element actually actively provides a change to correct a problem (e.g., defocussing) detected by the controller from the signal information of the wavefront sensor. In this regard see, for example, the article by Peter A. Jones entitled "Alignment And Focus Control Of A Telescope Using Image Sharpening", published in the *SPIE Proceedings*. Vol. 1542-18, 1991, at pages 194-204, which discusses a thought process for using information from a wavefront sensor in active optical systems.

Various types of wavefront sensors are known in the prior art. For example, it is known in radar, sonar, and camera focussing technology to send out a signal wavefront and measure the round trip time of such signal wavefront to determine distance to an object. Such distance information is then used to focus the camera or determine where an object is located in object space.

U.S. Pat. No. 4,667,103 (J. T. Watson et al.), issued on May 19, 1987, discloses a wavefront sensor for a large optical system, such as a telescope, comprising an objective lens, a reticle with at least one slit therein to provide an aperture, a field lens, and an array of infrared sensor cells. The objective lens images an infrared ground scene onto the reticle which provides image signatures for various portions of the aperture to an array of infrared sensor cells via the field lens. The resulting time difference between the image signatures of the aperture represents relative image displacement caused by a wavefront slope variation in the actual received wavefront.

U.S. Pat. No. 4,712,913 (N. Bareket), issued on Dec. 15, 1987, discloses a linear-scanned-array wavefront sensor. In the wavefront sensor, a plurality of sample beam wavefronts derived from selected portions of a wide aperture optical beam wavefront enter an entrance pupil located adjacent a focal surface on which the sample beams are individually focussed. A relay lens system transmits the sample beams to a beam splitter which divides each of the sample beams into an undeviated and a deviated component. The undeviated components of the sample beams image the entrance pupil onto a first dithering scanning mirror, and the deviated components of the sample beams image the entrance pupil onto a second dithering scanning mirror. The first and second scanning mirrors are dithered to sweep sample beam spots across first and second focal planes, respectively, where a plurality of linear photodetector arrays are positioned. Line centroids of the sample beam spots at the first and second focal planes are calculated by a processor. Any deviation in the line centroid provides an indication of an aberration in the received wavefront.

Prior art wavefront sensors for use with active optical systems require moving parts and many components such as reference lasers, lenses, gratings, beam splitters, stationary and movable mirrors, multiple light beam paths, and a plurality of detector arrays which make such wavefront sensors complicated and expensive. Still further, many prior art wavefront sensors use a point source, as a star or a reference laser, to determine whether an out-of focus condition exists, and are unable to provide such information when looking at a wide area (extended scene) in object space.

It is desirable to provide a wavefront sensor which is simple and relatively inexpensive, and provides output signals from which information relating to aberrations in wavefronts received directly from an extended scene in object space can be determined and, in turn, used by separate active devices to correct for such aberrations.

SUMMARY OF THE INVENTION

The present invention is directed to a simple and relatively inexpensive scene-based wavefront sensor and a scene-based wavefront sensing method which does not include moving parts and generates information signals in real time of aberrations in received wavefronts directly from light received from a scene in object space being scanned by movement of either the wavefront sensor or elements of the scene.

Viewed from one aspect, the present invention is directed to a scene-based wavefront sensor comprising an opaque material having a surface and defining a probe hole therethrough, an imaging system, a linear image sensor array, and a pupil sensor array. The imaging system comprises at least one lens forming a predetermined pupil for imaging a remote scene having edges therein disposed in object space onto the surface of the opaque material and the probe hole. The linear image sensor array comprises a plurality of image light detecting sensors disposed adjacent to the probe hole and perpendicular to a direction of relative motion occurring between the imaging system and the edges in the remote scene. The image sensor array receives light from the imaging system imaged at the surface of the opaque material as the wavefront sensor is moved to scan the remote scene. Each image light detecting sensor is adapted to generate separate electrical output signals representative of the received light intensity at any instant of time as edges of the remote scene move relative to the imaging system. The pupil sensor array is disposed at an image plane of the predetermined pupil of the imaging system projected through the probe hole. The pupil sensor array comprises a plurality of pupil light detecting sensors disposed in a two-dimensional array for receiving light imaged thereon as the wavefront sensor is moved to scan the remote scene. Each pupil light detecting sensor is adapted to generate separate electrical output signals representative of the received light intensity at any instant of time.

Viewed from another aspect, the present invention is directed to a method of sensing aberrations in a remote scene including edges disposed in object space. In a first step, edges of the remote scene are moved in a predetermined direction of scan. In a second step, the light from the remote scene being scanned in the first step is imaged at a first image plane by an imaging lens system having a predetermined pupil. In a third step, a magnitude of light intensity versus time in the image of the remote scene is sensed at the first image plane along a line perpendicular to the predetermined direction of scan as the edges of the remote scene move in the first step using a linear image sensing array comprising a plurality of light detecting sensors that generate separate electrical output signals. In a fourth step, the predetermined pupil of the imaging lens system is imaged through a probe hole defined in the first image plane onto a second image plane. In a fifth step, a magnitude of light intensity versus time occurring across the image of the predetermined pupil of the imaging lens system is sensed at the second image plane as the edges of the remote scene move relative to the first image plane using a two-dimensional pupil sensing array comprising a plurality of light detecting sensors that each generate separate electric output signals. In a sixth step, the electrical output signals generated by the light detecting sensors in the third and fifth steps are processed for detecting aberrations between intensity versus time electrical output signals from the linear image sensing array and the pupil sensing array, and for generating electrical output control signals representative of such aberrations.

The invention will be better understood from the following more detailed description taken with the accompanying drawings and claims.

BRIEF DESCRIPTION OF THE DRAWINGS

The drawings are not necessarily to scale, and corresponding elements with the same function in the various figures are given the same designation number.

DETAILED DESCRIPTION

Figure 1:
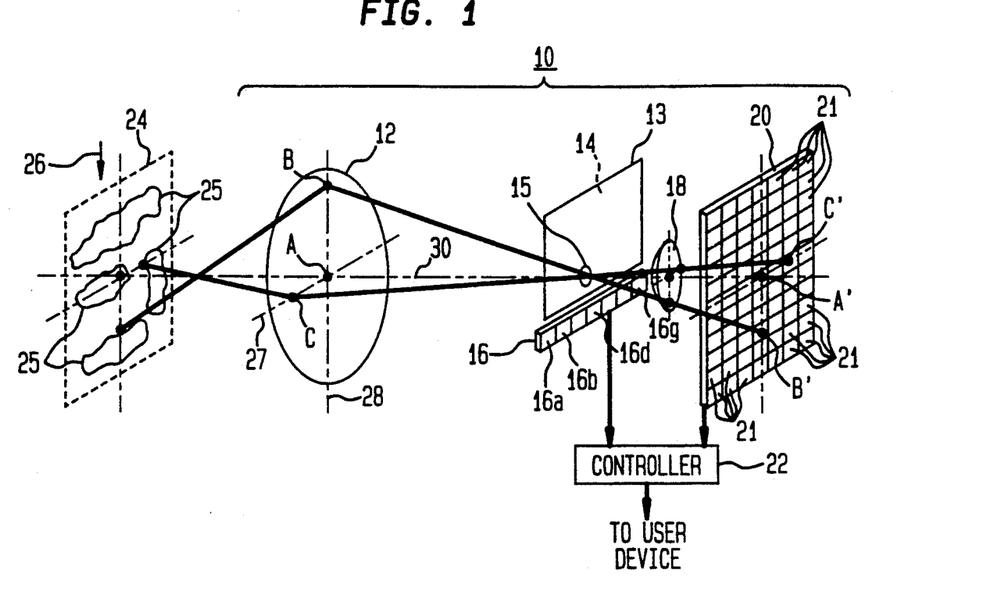
FIG. 1 shows a view in perspective of a scene-based wavefront sensor in accordance with the present invention.

Referring now to FIG. 1, there is shown a perspective view of a scene-based wavefront sensor 10 in accordance with the present invention. The wavefront sensor 10 comprises an imaging system 12 defining a predetermined pupil, a light opaque material 13 having a surface 14 which defines a probe hole (pinhole) 15 therethrough, an image sensor array 16, a relay lens 18, a pupil sensor array 20 including a plurality of light sensors 21, and a controller 22. More particularly, the imaging system 12 comprises one or more lenses and/or mirrors (not shown) which image at least a portion of a remote scene 24 (shown within a dashed-line rectangle and defining multiple edges 25) at the plane of the surface 14 defining the probe hole 15. The imaging system 12 has a predetermined pupil which hereinafter is assumed to be at a plane defined by axes 27 and 28 orthogonal to a longitudinal axis 30 of the imaging system 12.

The image sensor array 16 comprises a linear array of seven optical sensors 16a to 16g, of which only optical sensors 16a, 16b, 16d, and 16g are provided with designation numbers. It is to be understood that the image sensor array 16 can comprise any number of aligned sensors such as photodiodes which provide a linear picture of a portion of the remote scene 24 momentarily imaged thereon by the imaging system 12. The image sensor array 16 is preferably disposed adjacent the probe hole 15 in a direction which is perpendicular to a direction of scan (shown, for example, by the arrow 26) of the remote scene 24 by the wavefront sensor 10. It is to be understood that if the direction of scan is orthogonal to arrow 26, then the image sensor array 16 is preferably positioned perpendicular to such scan direction.

The relay lens 18 is positioned to image the predetermined pupil of the imaging system 12 onto the plurality of light sensors 21 of the pupil sensor array 20. More particularly, the light emanating from various points on the predetermined pupil of the imaging system 12 pass through the probe hole 15 and are imaged as corresponding points on the pupil sensor array 20. For example, points A (on longitudinal axis 30), B (on axis 28), and C (on axis 27) on the predetermined pupil of imaging system 12 pass through the probe hole 15 and are imaged as points A′, B′, and C′, respectively, on the pupil sensor array 20. Although the relay lens 18 is shown, for ease of illustration, as being disposed a distance behind the probe hole 15, it is to be understood that the relay lens 18 is preferably located very close to the probe hole 15 so that the probe hole 15 acts as an aperture stop for the relay lens 18. Such location of the relay lens 18 also reduces the size of the pupil sensor array 20 and, in turn, the wavefront sensor 10. Signals emanating from each of the sensors 16a–16g of the image sensor array 16 and the individual elements 21 of the pupil sensor array 20, respectively, are transmitted to the controller 22 for processing.

Figure 2:
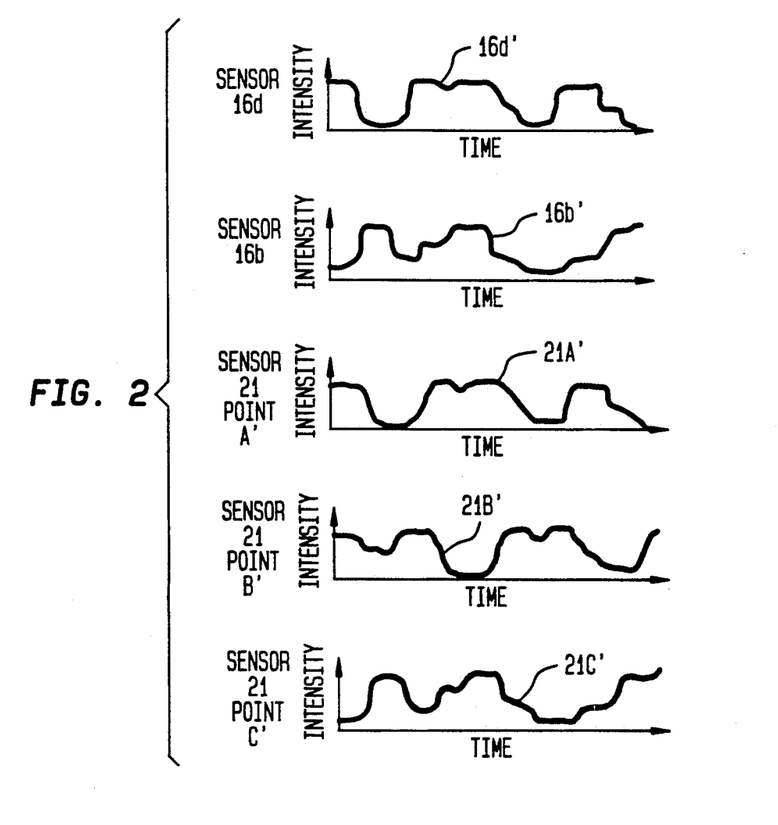
FIG. 2 shows exemplary waveforms of light intensity versus time produced by particular light sensors in an image sensor array and a pupil sensor array of the scene-based wavefront sensor of FIG. 1 in accordance with the present invention.

Referring now to FIG. 2, there is shown exemplary waveforms of light intensity (INTENSITY) versus time produced by sensors 16b and 16d of the image sensor array 16, and by sensors 21 disposed at points A', B', and C' of the pupil sensor array 20. Such waveforms are used hereinafter to describe the operation of the scene-based wavefront sensor 10.

Figure 3:
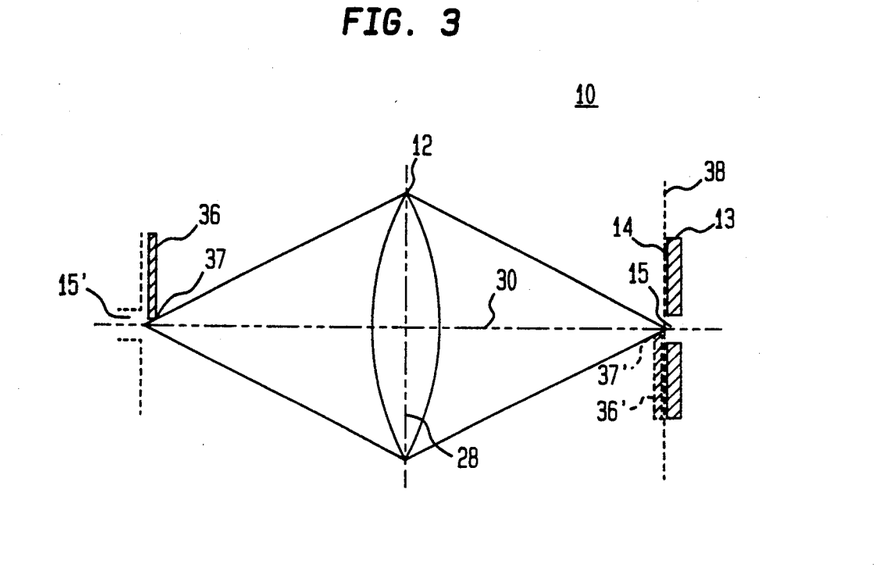
FIG. 3 shows a side view of an imaging system for explaining a concept and operation of the scene-based wavefront sensor of FIG. 1.

Referring now to FIG. 3, there is shown a side view of the imaging system 12, the light opaque material 13, and a knife 36 having an edge 37 for explaining a concept and operation of the scene-based wavefront sensor 10. More particularly, the knife 36, when positioned in object space with its edge 37 placed on the longitudinal axis 30 of the imaging system 12, is imaged by the imaging system 12 onto an image plane 38 behind the imaging system 12 as shown by the knife image 36' and its edge 37' (shown in dashed line form). Similarly, when the probe hole (pinhole) 15 is centered on the longitudinal axis 30 at the image plane 38, the probe hole 15 is projected into object space as shown by the projected probe hole 15' shown in dashed-line form. As a result, the real edge 37 of the knife 36 is superimposed on the projection 15' of the probe hole 15 in object space, and the image 37' of the edge 37 is projected onto the probe hole 15 at the image plane 38. This illustrates how the image 37' of a knife edge 37 in object space and the projection 15' of the probe hole 15 in image space combine to form a variation of a known knife edge test. The projection 15' of the probe hole (pinhole) 15 simulates a point source because any illumination coming from the point source that is seen by an observer behind the image plane 38 is only that which comes through the probe hole (pinhole) 15. In other words, the illumination is only that illumination coming from the area inside the projection 15' of the pinhole 15. Therefore, the observer sees a shadow pattern in the pupil of the imaging system 12 which is identical to that of the known traditional knife edge test.

Figure 4:
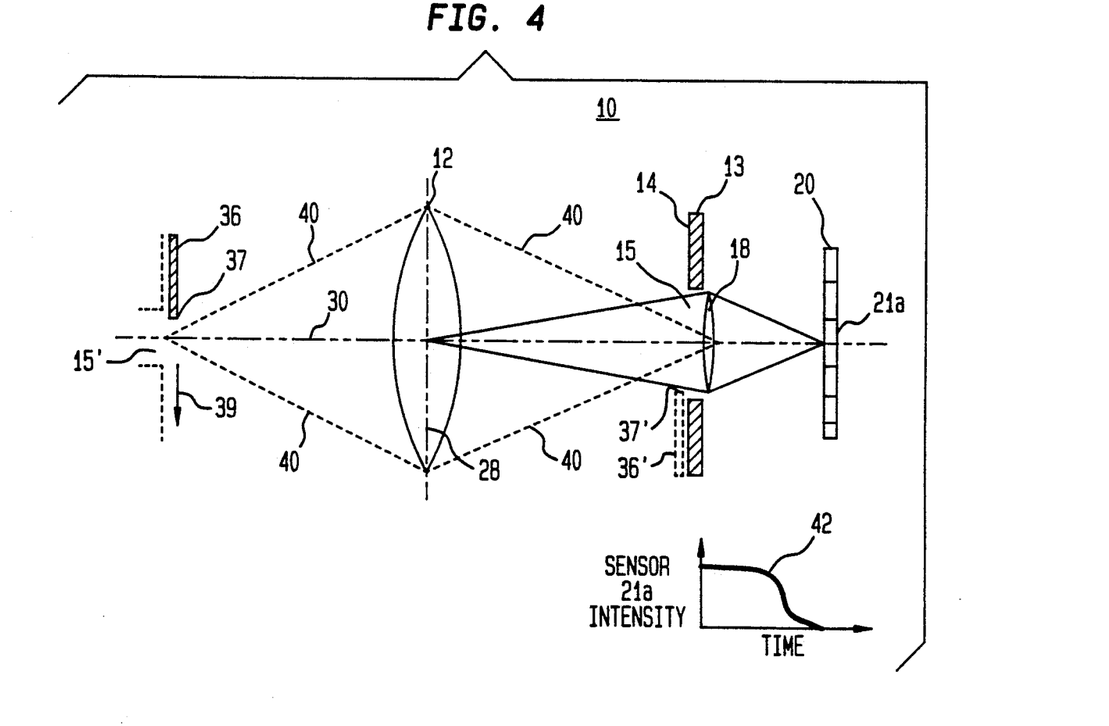
FIGS. 4 and 5 each show a side view of the scene-based wavefront sensor of FIG. 1 and exemplary waveforms produced at selected points in the wavefront sensor for explaining a concept and operation of the scene-based wavefront sensor of FIG. 1.
Figure 5:
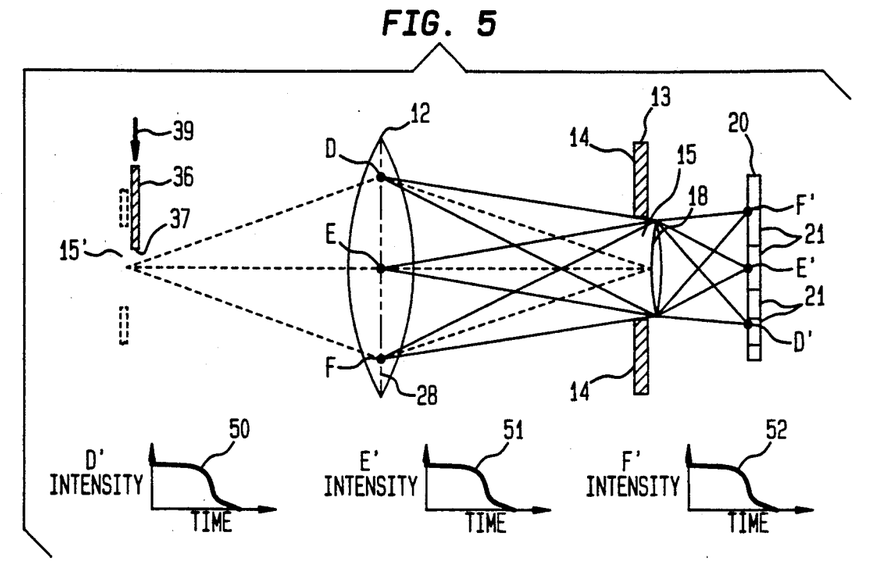
Figure 6:
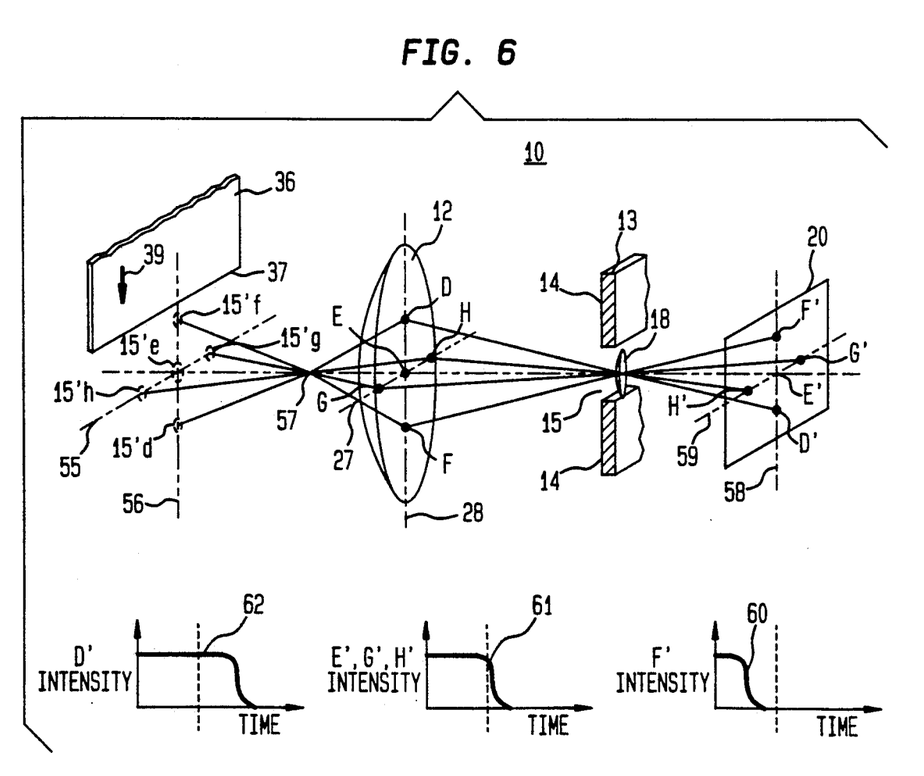
FIG. 6 shows a view in perspective of the scene-based wavefront sensor 10 of FIG. 1, where a probe hole or a scene in object space is not disposed at a focal plane of an imaging system 12 in the scene-based wavefront sensor, and exemplary waveforms produced at selected points in the wavefront sensor for explaining a concept and operation of the scene-based wavefront sensor.

Referring now to FIGS. 4, 5, and 6, each figure shows a view of the scene-based wavefront sensor 10 and exemplary waveforms produced at selected points in the wavefront sensor for further explaining the concept and operation of the scene-based wavefront sensor 10. FIG. 4 shows that the imaging system 12 provides the known traditional knife edge test via dashed line light rays 40. Still further, the wavefront sensor 10 images the pupil (at axis 28) of the imaging system 12 onto the pupil sensor array 20 by the relay lens 18 disposed adjacent the probe hole 15. More particularly, if the edge 37 of the knife 36 is scanned (a shown by arrow 39) "as" in object space across a projection 15' in object space of the probe hole 15, the image 37' of that edge also scans across the probe hole 15. As a result, illumination of the pupil of the imaging system 12 located at axis 28 is cut off from the detector 21a in accordance with the exemplary curve 42.

FIG. 5 provides a further explanation of the concept and operation of the wavefront sensor 10 shown in FIG. 4. More particularly, the pupil sensor array 20 is disposed at a plane conjugate to a plane of a pupil (shown at axis 28) of the imaging system 12. As a result, any point (e.g., points D, E, and F) in the pupil of the imaging system 12 has a corresponding point (e.g., points D', E', and F', respectively) on the pupil sensor array 20 as a result of the imaging of the pupil on the pupil sensor array 20 by relay lens 18. Conversely, each point on the pupil sensor array 20 has a corresponding point on the pupil of the imaging system 12. If the pupil of the imaging system 12 is divided into subaperture cells, then each subaperture cell of the pupil is imaged onto a corresponding cell at the pupil sensor array 20. The intensity of the light seen by each cell of the pupil sensor array 20 is plotted on the Y-axis with time plotted on the X-axis as the knife edge 37 scans (in the direction of arrow 39) across the projection 15' of the probe hole 15 in object space. As a result, each plot of light intensity versus time at each cell of the pupil sensor array 20 corresponds to that obtained with a knife edge test for the corresponding subaperture cell at the pupil of the imaging system 12.

If the imaging system 12 is perfect, and the probe hole 15 is at the focus of the imaging system 12, all points along the pupil of the imaging system 12 project the probe hole 15 (pinhole) to a same point in object space. Under such condition, the light intensity versus time plots for all subaperture cells of the pupil and the pupil sensor array 12 are identical and the same as the plot 42 (shown in FIG. 4) obtained across the aperture of the pupil of the imaging system 12. More particularly, the points D, E, and F at the pupil (along axis 28) of the imaging system 12 are imaged by the relay lens 18 onto corresponding points D', E', and F' on the pupil sensor array 20. With the probe hole (pinhole) 15 and its projection 15' in object space being located at the opposing foci of the imaging system 12, each of the light intensity versus time plots 50, 51, and 52 obtained by light sensors 21 disposed at points D', E' and F', respectively, are identical as the knife edge 37 is scanned in direction 39 in object space across the projection of the probe hole 15'. This is because all points along the pupil of the imaging system 12 "see" the projection 15' of the probe hole 15 at the same time. It is to be understood that the probe hole 15 and the relay lens 18 should be close enough that the probe hole 15 acts as an aperture stop for the relay lens 18.

FIG. 6 shows a view in perspective of the scene-based wavefront sensor 10 where the probe hole 15 or a scene (not shown) in object space is not disposed at a focal plane of the imaging system 12 and thus produces aberrations. When the probe hole 15 or the scene in object space is not disposed at a focal plane of the imaging system 12, projections 15' of the probe hole 15 formed by different parts of the aperture of the pupil (e.g., along a plane of horizontal axis 27 and vertical axis 28) of the imaging system 12 fall in different locations in object space. More particularly, the probe hole 15 is projected via separate exemplary points D (on axis 28 above the junction of axes 27 and 28), E (at the junction of axes 27 and 28), F (on axis 28 below the junction of axes 27 and 28), G (on axis 27 to a first side of the junction of axes 27 and 28), and H (on axis 28 to a second opposing side of the junction of axes 27 and 28) on the two-dimensional pupil aperture of the imaging system 12 to form inversely-positioned probe hole projections 15'd, 15'e, 15'f, 15'g, and 15'h, respectively, along horizontal axis 55 and vertical axis 56 in the plane of object space not disposed at focal point 57.

When an edge 37 of a knife 36 disposed parallel to a horizontal axis 55 in object space is scanned downward in the direction of arrow 39 across the plane of object space, the different points D, E, F, G, and H at the pupil of the imaging system 12 "see" such knife edge 37 at predetermined separate times depending on the scanning rate. In sequence, the probe hole projection 15'f "sees" the knife edge 37 first since the projection 15'f is located above the axis 55, the probe hole projections 15'e, 15'g, and 15'h concurrently "see" the knife edge 37 at a predetermined time after the probe hole projection 15'f since the probe hole projections 15'e, 15'g, and 15'h are found along axis 55, and the probe hole projection 15'd "sees" the knife edge 37 at a predetermined time after probe hole projections 15'e, 15'g, and 15'h since the projection 15'd is found below axis 55. As a result, light sensors 21 (not shown) disposed at points D', E', F', G' and H' of the pupil sensor array 20 which are located at the images of points D, E, F, G, and H, respectively, on the pupil produce light intensity versus time signals that change at different times.

For example, the pupil sensor 21 at point F' produces a plot 60 of light intensity versus time as the knife edge 37 scans across the probe hole projection 15'f. The pupil sensors 21 at points E', G', and H' each produce a plot 61 of light intensity versus time as the knife edge 37 concurrently scans across the probe hole projections 15'e, 15'g, and 15'h. The pupil sensor 21 at point D' produces a plot 62 of light intensity versus time as the knife edge 37 scans across the probe hole projection 15'd. As a result, the pupil sensor 21 and point F' produces a plot 60 of light intensity versus time where the light intensity drops off sooner than found in a plot 61 produced by the pupil sensors 21 at point E', G', and H'. Similarly, the pupil sensors 21 and point E', G', and H' produce a plot 61 of light intensity versus time where the light intensity drops off sooner than found in a plot 62 produced by a pupil sensor 21 at point D'. The distances between such drop-off regions in each of the plots 60, 61, and 62 of light intensity versus time represents a transverse aberration directly. The amount of transverse aberration also is a measure of the amount the plane of object space is out of focus.

From plots 60, 61, and 62 of FIG. 6, the transverse aberration is visible in the vertical plane parallel to axes 56 (in object space) and 28 (in the pupil of imaging system 12) due to time differences between the plots for sensors 21 at points D', E', and F' disposed along a vertical axis 58 of the pupil sensor array 20. In the horizontal plane parallel to a horizontal axis 59 of the pupil sensor array 20, the aberration is not detectable since the plots 61 for the sensors 21 at points E', G', and H' have no time differences in when the light intensity drops off. In other words, the knife edge 37 is "seen" at the same time at points E', G', and H' even though the aberration is present. For this reason, it is necessary to have edges scanned in more than one orientation in order to map aberrations in both dimensions.

Referring again to FIGS. 1 and 2, in order to use the wavefront sensor 10 with edges 25 in a real scene 24, it is necessary to know something about the edges 25. Thus, assuming a scanning of the scene 24 in one direction only, the linear image sensor array 16 is needed in the plane of the image of the remote scene 24 at the surface 14 of the probe hole 15 to gather information about the images of the edges 25 as they go past the sensors 16a-16g. A linear array 16 aligned perpendicular to the direction 26 of scan of the scene 24 provides a two-dimensional picture of the scene 24. More particularly, when the wavefront sensor 10 is stationary, each of the sensors 21 of the pupil sensor array 20 sees a separate portion of a part of the scene 24 via the imaging system 12 and the probe hole (pinhole) 15. Under such stationary condition of the wavefront sensor 10, there is no change in the light intensity at each sensor 21 of the pupil sensor array 20. This provides no specific information about the edges 25 and, in turn, whether there are aberrations in the viewed scene. To obtain information about the edges 25 in the remote scene 24 and whether an aberration exists, the wavefront sensor 10 is moved to scan the scene 24 in a direction normal to the linear image sensor array 16.

In operation, as the wavefront sensor 10 scans the scene 24 in the direction of arrow 26, each of the image sensors 16a-16g of the image sensor array 16 and the pupil sensors 21 of the pupil sensor array 20 provide output signals of detected light intensity versus time. For example, as is shown in FIG. 2, the image sensors 16b and 16d produce the waveforms 16b' and 16d', respectively, while the pupil sensors 21 at points A', B' and C' (shown only in FIG. 1) on the pupil sensor array 20 produce the waveforms 21A', 21B', and 21C' (all shown in FIG. 2), respectively, as shown in FIG. 2. The output signals from each of the image sensors 16a-16g are sent to the controller 22 (shown in FIG. 1) and correlated with signals produced by the pupil sensors 21 to determine where that part of the pupil of the imaging system 12 is "looking". For example, as shown in FIG. 2, the waveforms 16b' and 16d' from image sensors 16b and 16d, respectively, are essentially the same as the respective waveforms 21C' and 21A' from pupil sensors 21 at points C' and A', respectively, on the pupil sensor array 20. The waveform 21B' from pupil sensor 21 at point B' on the pupil sensor array 20 is essentially the same, but delayed by a predetermined amount, as the waveform 16d' from image sensor 16d. Such information from the image sensors 16a-16g and the pupil sensors 21 is used by the controller 22 to determine what point in the scene 24 is being imaged onto the probe hole 15 by the imaging system 12. This is accomplished by a comparison in real time of the output signals from the pupil sensor array 20 with the output signals from the image sensor array 16. Signals between parallel image (16) and pupil (21) sensors which substantially correspond in phase over time, after compensation for the time for the image to scan from the probe hole 15 to the image sensor array 16, determine what point in the scene 24 is being imaged onto the probe hole 15. The time taken for the image of the object scene 24 to scan from the probe hole 15 to the image sensor array 16 is easily calculated knowing the scan velocity of the scene 24 and the distance between the probe hole 15 and the image sensor array 16.

Still further, the information signals from the image sensors 16a-16g and the pupil sensors 21 are used by the controller 22 to generate output control signals to a user device (not shown) for correcting for any aberrations in the scanned scene 24. The controller 22 uses any suitable algorithm for detecting certain differences in the received waveforms from the image sensors 16a-16g and the pupil sensors 21, and for generating appropriate control signals to the user device to correct for the detected aberrations. For example, it is to be understood that when a perfect non-aberrated imaging system 12 is assumed, the image sensor array 16 sees a point in the object plane at a slightly different time than when that point crosses over the probe hole 15 because they are slightly offset. On the other hand, the pupil sensor array 20 sees an image of the plane of the pupil of the imaging system 12 and not an image of a portion of scene 24 at the object plane. Since there are no changes in distances between the pupil, the relay lens 18, and the pupil sensor array 20, each pupil sensor 21 always sees the image of its corresponding cell of the pupil.

More particularly, points A, B, and C on the pupil are always imaged to points A', B', and C', respectively, of the pupil sensor array 20 regardless of any movement of the scene 24 in object space. To determine the transverse aberration of the imaging system 12, a time difference between the output signal of each pupil sensor cell 21 and each image sensor cell 16 with a same function (waveform) shape is calculated by controller 22. In FIG. 2, this is a time delay between, for example, the plot 16d'of the image sensor 16d and the plot 21B' produced by the pupil sensor 21 at point B'. Such calculated delay, compensated for time taken to scan from the probe hole 15 to the image sensor array 16, is then multiplied in controller 22 by the scan velocity along direction 16 (shown in FIG. 1) to yield the transverse aberration directly for that pupil sensor 21 at point B'.

Figure 7:
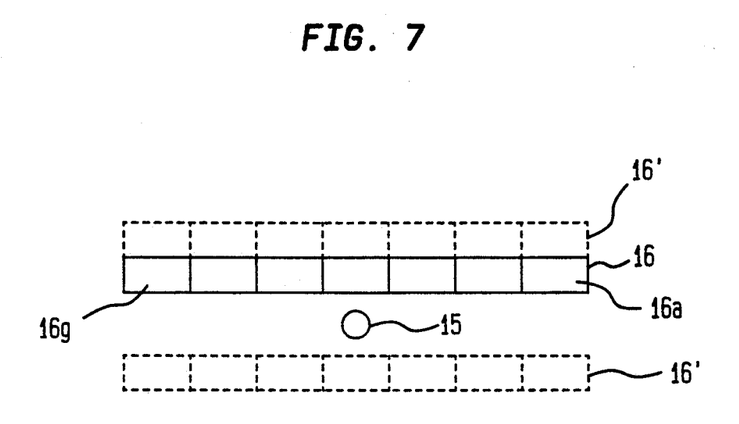
FIG. 7 shows a front view of a probe hole and one or more linear image sensor arrays disposed adjacent the probe hole in the wavefront sensor of FIG. 1 in accordance with the present invention.

Referring now to FIG. 7, there is shown a front view of the probe hole 15, the linear image sensor array 16, and one or more additional optional linear image sensor arrays 16' (shown in dashed-line form) disposed adjacent the probe hole 15 and the linear image sensor array 16 in the wavefront sensor 10 of FIG. 1 in accordance with the present invention. The linear image sensor array 16 is shown as disposed above the probe hole 16, and an additional optional linear image sensor array 16' can be disposed either below the probe hole 15, or adjacent the linear image sensor array 16. Still further, more than one additional optional linear image sensor array 16' can be added above or below the probe hole 15 to fulfill a signal collection requirement.

More particularly, if the wavefront sensor 10 is looking at something that is optically very faint (e.g., a distant star) or the information needed by the wavefront sensor 10 is arriving at a very fast pace (e.g., very fast movement within a stationary scene 24 being viewed) and all the information of the imaged scene 24 is critical, it is necessary that none of the image plane information at the surface 14 of the probe hole 15 be lost or sacrificed. Therefore, when such condition is anticipated, one or more additional linear image sensor arrays are added to make sure all the information about a weak signal or a fast paced scene signal is obtained at the image of the scene and no information is lost. Whether one or more linear image sensor arrays 16' are added to the original linear image sensor array 16 is mainly a question of the application to which the wavefront sensor 10 is being applied, and whether or not any of the information at the imaged scene produced by the imaging system 12 can be lost or sacrificed. In other words, the additional linear image sensor arrays 16' are used in cases where the wavefront sensor 10 is used to look at scene that produces a weak signal, or where every little bit of information of the imaged scene 24 is critical. This avoids losing information from the image of the scene 24 produced by the imaging system 12 that is needed by the wavefront sensor 10 to detect aberrations.

Figure 8:
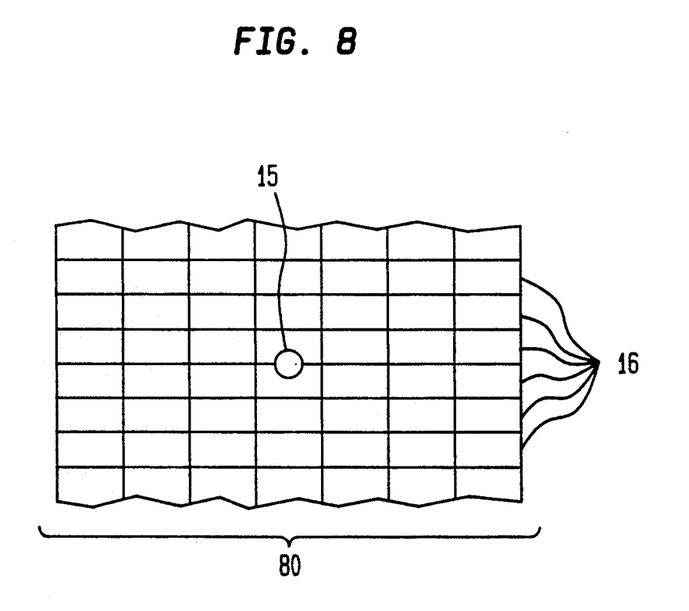
FIG. 8 shows a front view of a probe hole formed in a two-dimensional image sensor array in the wavefront sensor of FIG. 1 in accordance with the present invention.

Referring now to FIG. 8, there is shown a front view of a probe hole 15 formed in a two-dimensional image sensor array 80 in the wavefront sensor 10 of FIG. 1 in accordance with the present invention. More particularly, a plurality of linear image sensor arrays 16 are disposed adjacent to each other in the surface 14 (shown in FIG. 1) for forming the two-dimensional image sensor array 80 for receiving the image of the scene 24 (shown only in FIG. 1) via the imaging system 12 (shown in FIG. 1). The probe hole 15 is formed (preferably centrally) in the two-dimensional image sensor array 80, and the pupil sensor array 20 (shown in FIG. 1) is positioned therebehind for receiving the image of the pupil of the imaging system 12. In other words, assuming a telescope already uses the imaging system 12 and the two-dimensional image sensor array 80 to obtain an image of a scene 24 at the image plane of the imaging system 12, then the wavefront sensor 10 of the present invention can be added to the telescope by forming the probe hole 15 in the two-dimensional image sensor array 80 and adding the relay lens 18 (shown in FIG. 1) and the pupil sensor array 20 behind the image sensor array 16. A controller 22 (shown only in FIG. 1) uses the information signals obtained from both sensor arrays 20 and 80 to produce output control signals to an active optical element of the telescope for correcting for any detected aberrations in the wavefronts from the scene 24. Movement of the telescope (to move the wavefront sensor 10) is periodically required because the distant star being viewed does not move, and a relative motion is needed between a scene 24 in object space and the imaging system 12 for the wavefront sensor 10 to operate properly.

An advantage of the scene-based wavefront sensor 10 is that it operates with a moving scene (e.g., an automobile or horse race) in real time while the wavefront sensor is held stationary without interfering with the prime imaging system 12. This eliminates having to stop and focus a telescope or camera and, meanwhile, missing whatever happens or goes by during that time. The scene-based wavefront sensor 10 is also operable with a stationary scene (e.g., a telescope or camera looking at the night sky) by periodically scanning the wavefront sensor 10 across the scene of interest in order to detect varying aberrations in the scene due to changing temperature, and, in turn, provide signals usable to correct for such detected aberrations.

It is to be appreciated and understood that the specific embodiments described hereinbefore are merely illustrative of the general principles of the invention. Various modifications may be made by those of ordinary skill in the art which are consistent with the principles set forth.

What is claimed is:

1. A scene-based wavefront sensor comprising:
   an opaque material having a surface and defining a probe hole therethrough;
   an imaging system comprising at least one lens forming a predetermined pupil for imaging a remote scene having edges therein disposed in object space onto the surface of opaque material and the probe hole;
   a linear image sensor array comprising a plurality of image light detecting sensors disposed adjacent the probe hole and perpendicular to a direction of relative motion occurs between the imaging system and the edges in the remote scene for receiving light from the imaging system imaged at the surface of opaque material, each image light detecting sensor being adapted to generate separate electrical output signals representative of the received light intensity at any instant of time as edges of the remote scene move relative to the imaging system; and
   a pupil sensor array disposed at an image plane of the predetermined pupil of the imaging system projected through the probe hole, the pupil sensor array comprising a plurality of pupil light detecting sensors disposed in a two-dimensional array for receiving light imaged thereon as the edges of the remote scene move relative to the imaging system, each pupil light detecting sensor being adapted to generate separate electrical output signals representative of the received light intensity at any instant of time.

2. The scene-based wavefront sensor of claim 1 further comprising a controller adapted to (a) receive the output electrical signals from the image light detecting sensors and the pupil light detecting sensors, (b) detect aberrations occurring between electrical output signals over a predetermined time period from the linear image sensor array and the pupil sensor array as the edges of the remote scene move relative to the imaging system, and (c) generate output control signals representative of such aberrations for use by an external device to correct for such aberrations.

3. The scene-based wavefront sensor of claim 2 further comprising at least a second linear image sensor array comprising a plurality of light detecting sensors disposed adjacent the probe hole and perpendicular to a direction of movement of the edges of the remote scene, the second linear image sensor array being adapted to receive light from the imaging system imaged at the surface of opaque material as the edges of the remote scene move relative to the imaging system, and to generate separate electrical output signals representative of the received light intensity at any instant of time to the controller.

4. The scene-based wavefront sensor of claim 1 further comprising at least a second linear image sensor array comprising a plurality of light detecting sensors disposed adjacent the probe hole and perpendicular to a direction of movement of the edges of the remote scene, the second linear image sensor array being adapted to receive light from the imaging system imaged at the surface of opaque material as the remote scene moves relative to the imaging system and to generate separate electrical output signals representative of the received light intensity at any instant of time.

5. The scene-based wavefront sensor of claim 4 further comprising a controller adapted to receive the output electrical signals from the linear image sensor array, the at least second linear image sensor array, and the pupil sensor array, and to measure any aberrations between similarly-shaped electrical output signals over a predetermined time period generated by (a) the linear image sensor array and the at least second linear image sensor array, and (b) the pupil sensor array as the edges of the remote scene move relative to the imaging system, and generating output control signals representative of such aberrations for use by an external device.

6. The scene-based wavefront sensor of claim 1 further comprising a relay lens disposed near the probe hole for imaging the pupil of the imaging system onto the pupil sensor array.

7. A method of sensing aberrations in a remote scene including edges therein disposed in object space comprising the steps of:
 (a) moving edges of the remote scene in a predetermined direction of scan;
 (b) imaging the light from the remote scene obtained in step (a) at a first image plane by an imaging lens system having a predetermined pupil;
 (c) sensing a magnitude of light intensity versus time of the image of the remote scene at the first image plane along a line perpendicular to the predetermined direction of scan as the edges of the remote scene move in step (a) using a linear image sensing array comprising a plurality of light detecting sensors that each generate separate electrical output signals;
 (d) imaging the predetermined pupil of the imaging lens system through a probe hole defined in the first image plane onto a second image plane;
 (e) sensing a magnitude of light intensity versus time across the image of the predetermined pupil of the imaging lens system at the second image plane as the edges of the remote scene move relative to the first image plane using a two-dimensional pupil sensing array comprising a plurality of light detecting sensors that generate separate electric output signals; and
 (f) processing the electrical output signals generated by the light detecting sensors in steps (c) and (e) for detecting aberrations between light intensity versus time electrical output signals from the linear image sensing array and the pupil sensing array, and for generating electrical output control signals representative of such aberrations.

8. The method of claim 7 wherein in performing step (c), sensing the magnitude of light intensity versus time of the image of the remote scene at the first image plane along a first and at least a second line perpendicular to the predetermined direction of scan as the edges of the remote scene move using a first and at least a second linear image sensing array, respectively, each linear sensing array comprising a plurality of light detecting sensors that generate separate electric output signals.

9. The method of claim 8 wherein in performing step (e), processing the electrical output signals generated by the light detecting sensors in steps (c) and (e) for detecting aberrations between similarly-shaped intensity versus time electrical output signals of (i) the first and at least second linear image sensing arrays and (ii) the pupil sensing array, and for generating electrical output control signals representative of such aberrations.

10. The method of claim 7 wherein in performing step (d), imaging the predetermined pupil of the imaging lens system through a probe hole defined in the first image plane onto a second image plane using a relay imaging lens.

* * * * *